(12) United States Patent
Yang

(10) Patent No.: US 6,407,699 B1
(45) Date of Patent: Jun. 18, 2002

(54) METHOD AND DEVICE FOR RAPIDLY EXTRACTING TIME AND FREQUENCY PARAMETERS FROM HIGH DYNAMIC DIRECT SEQUENCE SPREAD SPECTRUM RADIO SIGNALS UNDER INTERFERENCE

(76) Inventor: Chun Yang, 113 Clover Hill La., Harleysville, PA (US) 19438

( * ) Notice: Subject to any disclaimer, the term of this patent is extended or adjusted under 35 U.S.C. 154(b) by 0 days.

(21) Appl. No.: 09/550,064

(22) Filed: Apr. 14, 2000

(51) Int. Cl.[7] .................................................. H04K 1/00
(52) U.S. Cl. .................. 342/357.12; 342/378; 342/418; 375/343
(58) Field of Search ...................... 342/357.12, 357.01, 342/357.06, 418, 378, 357.15; 375/148, 343, 346

(56) References Cited

U.S. PATENT DOCUMENTS

| | | | | |
|---|---|---|---|---|
| 4,701,934 A | * | 10/1987 | Jasper .............................. 375/1 |
| 4,785,463 A | * | 11/1988 | Janc et al. ....................... 375/1 |
| 5,323,322 A | * | 6/1994 | Mueller et al. .............. 364/449 |
| 5,663,734 A | * | 9/1997 | Krasner ....................... 342/357 |
| 5,781,156 A | * | 7/1998 | Krasner ....................... 342/357 |
| 5,798,732 A | * | 8/1998 | Eshenbach ................... 342/357 |
| 5,874,914 A | * | 2/1999 | Krasner ....................... 342/357 |
| 6,133,871 A | * | 10/2000 | Krasner ................. 342/357.06 |
| 6,259,402 B1 | * | 7/2001 | Asai ....................... 342/357.12 |

\* cited by examiner

Primary Examiner—Michael J. Zanelli
Assistant Examiner—Eric Gibson
(74) Attorney, Agent, or Firm—LaMorte & Associates

(57) ABSTRACT

A GPS receiver and associated method that embodies high-dynamic, fast acquisition, and interference-suppressing capabilities for the reception and processing of GPS signals from a plurality of GPS satellites to produce GPS signal time and frequency parameters and navigation fixes. The GPS receiver includes an antenna and an analog front-end to intercept the incoming radio-frequency signal, band-limiting amplify the signal, and to convert it to an appropriate intermediate frequency so that it may be converted to digital form. One or more high-speed digital signal processors (DSP) constitute an all digital software baseband processor that process the sampled and quantified signals to form a two-dimensional delay-Doppler map of correlation power and to extract the signal time and frequency parameters and navigation data. The baseband processor is organized into functionally identical channels, each dynamically assigned to a different satellite visible. The baseband processor performs the incoming signal time-tagging, transformation, replica generation, interference-suppressing, delay-Doppler mapping and frequency uncertainty planning. The baseband processor also performs integration for larger processing gain, parameter extraction, and operational management. A relatively slow-speed microprocessor, coupled to the baseband processor, integrates the signal time and frequency parameters and navigation data from a plurality of GPS satellites to produce a navigation solution by a Kalman filter or a least-squares estimator.

18 Claims, 12 Drawing Sheets

METHOD AND DEVICE FOR RAPIDLY EXTRACTING TIME AND FREQUENCY PARAMETERS FROM HIGH DYNAMIC DIRECT SEQUENCE SPREAD SPECTRUM RADIO SIGNALS UNDER INTERFERENCE

RELATED APPLICATIONS

This application is related to co-pending U.S. patent application No. 09/294,221, filed April 19, 1999, entitled, Device And Method For Rapidly Obtaining Direct Acquisition Of A Long Code Sequence In Spread Spectrum Transmission, the disclosure of which is incorporated into this document by reference.

BACKGROUND OF THE INVENTION

1. Field of the Invention

The present invention relates to devices and methods for rapidly extracting time and frequency parameters from high dynamic radio signals used for direct sequence spread-spectrum communication and measurement that are corrupted with various interference signals. More particularly, the present invention system relates to extracting time and frequency parameters from the code division multiple access spread spectrum signals used in the Global Positioning System (GPS) as those signals are being either accidentally or purposely jammed.

2. Description of the Prior Art

Radio navigation systems have long been used by airplanes and ships to provide a means of electronically determining geographic position. Today, the most advanced radio navigation system is the Global Positioning System (GPS) which is maintained by the government of the United States of America. GPS radio navigation relies upon a constellation of twenty four satellites that are in six different orbits around the earth. Navigational fixes obtained through the GPS radio navigational system are based upon measurements of propagation delay times of the signals broadcast by the orbiting satellites. Normally, to use the GPS navigation system, a user must receive signals from at least four satellites in order to solve the variables of longitude, latitude, altitude and time that are needed to precisely determine location.

Each GPS satellite transmits a radio signal at two carriers. The frequency of the two carriers are 1.57542 GHz and 1.2276 GHz, respectively. The 1.57542 GHz carrier is herein refereed to as the L1 carrier and the 1.2276 Ghz carrier is refereed to as the L2 carrier. Both carrier signals are binary phase modulated with a 50 bits per second (bps) navigation data message that provides the satellite orbital information and other information. In addition, the L1 carrier is further modulated with a 1.023 mega-chips per second (Mcps) coarse acquisition spectrum-spreading code sequence, (herein C/A-code), and a 10.23 Mcps precision code sequence or its encrypted version, (herein P(Y)-code).

The L2 carrier is modulated, as it stands today, only with the 10.23 Mcps P(Y)-code. A C/A code sequence is 1 ms long while a P(Y)-code has a periodicity of exactly one week. Each spectrum-spreading code sequence is unique for a satellite and is used as the identifier for that satellite. Since GPS satellites are equipped with and controlled by a set of ultra precise atomic oscillators, the GPS signal carrier phase and its modulating codes are exactly the reading of the onboard atomic clock's GPS time at which the signal is transmitted.

When travelling from a GPS satellite to a near earth surface user, the GPS signal experiences a propagation delay about 76 ms. The length of the propagation delay directly relates to the distance range between the GPS satellite and the user. Due to the relative motion between the transmitting satellite and the user, the GPS signal is either stretched or squeezed at reception, as compared to its original form at transmission. This is the so-called Doppler effect and the additional frequency incurred to the signal is the Doppler frequency shift.

A GPS receiver attempts to measure the propagation delay (range) and Doppler frequency shift (range rate) in the received signal and to demodulate the navigation data bits. Since the transmission time is embedded in the signal carrier and code phase, a locally generated replica is used to match or correlate with the incoming signal in both time and frequency in order to provide the satellite clock reading of the transmission. Each GPS receiver has its own clock, albeit inexpensive, and uses it to mark the signal at reception relative to this local time base. The difference between the two time tags is a measurement of the respective signal propagation delays and the range to each satellite is then calculated by multiplying each delay by the speed of light.

A successful correlation between the local replica and the incoming signal removes the spectrum-spreading code and identifies which GPS satellite is being received. This despreading process increases the signal to noise ratio (SNR) and allows the only-remaining navigation data bits to be demodulated. The navigation data bits provide the precise orbital location of the satellite and other error-correcting coefficients. The location and time of the user are then found by solving known equations that incorporate the measured range to the known location of the GPS satellites.

A typical GPS receiver consist of four subsystems. Those subsystems include a radio frequency (RF) front-end with a pre-amplified antenna, a baseband processor, a navigation processor, and a user interface. The RF front-end down converts the GPS signal from the L1 carrier at a GHz range to a suitable intermediate frequency (IF) at a MHz range before sampling and quantization. A conventional baseband processor closes typically twelve identical tracking channels, which contain mixers, accumulate and dump (i.e., early, punctual, late correlators), numerical controlled oscillators (NCOs), a code generator. The input from the RF front-end to the baseband processor is at the MHz range but the software closure of tracking channels by the baseband processor after correlators operates at the kHz range. In addition to code and carrier tracking loops closure, the baseband processor also conducts navigation data demodulation and GPS observable generation at appropriate rates. Finally, the navigation processor operates at the several Hz range for GPS satellite orbit calculation, navigation solution, and data input/output to the user.

Since the inception, GPS receiver technologies have made steady transitions from analog to digital, from single-channel sequential-multiplexing to multiple-channel parallelism, and from GPS-alone to an integrated GPS/GLONASS (Global Navigation Satellite System—the Russian equivalent of GPS). Other advancements include the use of narrowly-spaced correlators for multipath reduction, massively parallel correlators for direct P(Y)-code acquisition, adaptive null-forming antennas for jamming suppression, and high-precision differential static and kinematic carrier phase positioning. However, these progresses are made mostly for conventional GPS receivers.

Conventional GPS receivers share a common architecture composed of two separate local loops. The local loops include a navigation loop and both a delay-locked loop and a phase/frequency-locked loop. The delay-locked loop and phase/frequency-locked loop are the physical tracking channels closed by software which are each assigned to a particular satellite. Code phase and carrier phase/frequency measurements are taken from the tracking channels, from which pseudorange, delta range, and integrated beat carrier phase observables are generated. These raw observables are then handed over to the navigation loop in which a Kalman filter or a least-squares estimator is implemented to produce position fixes.

Despite of popular use, it has been recognized that the conventional receiver architecture is inherent of two technical problems. One is the bandwidth tradeoff between noise performance and dynamic responsiveness. External aiding has been sought as a remedy to this problem but only achieved a mixed success. Moreover, the tracking loops, designed based upon small-error linear models, may be affected adversely by the actual nonlinearity effort of error discriminants as well as signal power variations under large jerk and strong interference. The other problem is the coupling between the two local loops. Ideally, all local loops of the tracking channels ought to be independent from one another. Their measurements are then recombined in the navigation loop of a Kalman filter. The Kalman filter only expects white noise in the other loop measurements. In practice, however, the loop measurements sent to the Kalman filter are neither "independent" nor "white". This is because the bandwidth of the local tracking loops is not infinite and that most receivers implement at least a point-solution to estimate the user clock bias and drift. Although some techniques have been proposed to take advantage of the over-determined inter-channel statistical correlation, they still utilize the conventional architecture and thus still face an uneasy task to move from an initial acquisition mode into the desired coupled-tracking mode.

To overcome the difficulties encountered by conventional designs, several techniques have been proposed. However, the techniques heretofore known either offer a partial and incomplete solution or a solution only workable under special settings. Such prior art techniques are exemplified by U.S. Pat. No. 4,601,005 to John Kilvington (1986), U.S. Pat. No. 4,701,934 to Steve Jasper (1987), U.S. Pat. No. 4,785,463 to Jane et al. (1988), and U.S. Pat. No. 4,998,111 to Stephen Ma et al. (1991). In such prior art systems, some suffer from excess computation. Others provide no concrete means to support critical yet no-trivial tasks such as measurement generation and offer no better way than throwing away those samples including a data bit sign reversal. This reduces the effective length of integration and the associated signal to noise ratio.

A need therefore exits for a novel GPS software receiver architecture and enabling transform-domain techniques that extend the operating envelope to high-dynamic conditions and interference-rich environment. This need is met by the present invention as described and claimed below.

SUMMARY OF THE INVENTION

The present invention is a GPS receiver and associated method that embodies high-dynamic, fast acquisition, and interference-suppressing capabilities for the reception and processing of GPS signals from a plurality of GPS satellites to produce GPS signal time and frequency parameters and navigation fixes. The GPS receiver includes an antenna and an analog front-end to intercept the incoming radio-frequency signal, band-limiting amplify the signal, and to convert it to an appropriate intermediate frequency so that it may be converted to digital form. One or more high-speed digital signal processors (DSP) constitute an all digital software baseband processor that process the sampled and quantified signals to form a two-dimensional delay-Doppler map of correlation power and to extract the signal time and frequency parameters and navigation data. The baseband processor is organized into functionally identical channels, each dynamically assigned to a different satellite visible. The baseband processor performs the incoming signal time-tagging, transformation, replica generation, interference-suppressing, and delay-Doppler mapping. The baseband processor also performs integration for larger processing gain, parameter extraction, and operational management. A relatively slow-speed microprocessor, coupled to the baseband processor, integrates the signal time and frequency parameters and navigation data from a plurality of GPS satellites to produce a navigation solution by a Kalman filter or a least-squares estimator.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
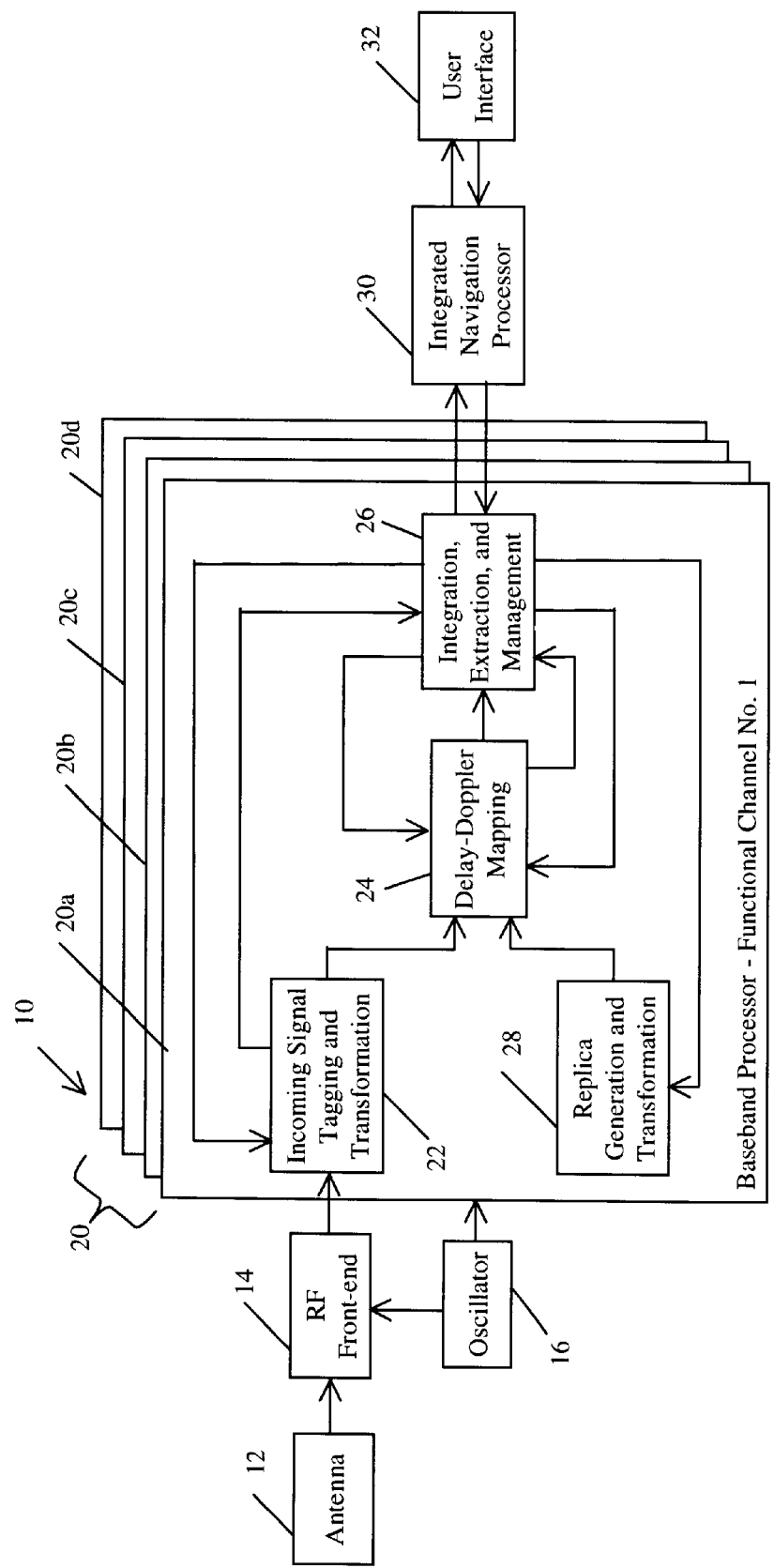
FIG. 1 is a schematic illustrating an exemplary embodiment of the overall architecture of the present invention system and method.

Although the present invention system and method can be used for the acquisition and tracking of many direct-sequence spread-spectrum signals, the present invention system and method are particularly well suited for use with the acquisition and tracking of signals from GPS satellites. Accordingly, an exemplary embodiment of the present invention will be described in an application of acquiring and tracking signals from GPS satellites for a high dynamic user in the presence of interference.

The satellites used in the GPS transmit signals. Consider a GPS signal represented by:

$$S_i(t) = AC_i(t)D(t)\cos[2\pi(f_0 + f_d)t + \phi_0] + n(t)$$

where i is the satellite number, A is the signal amplitude, $C_i(t)$ is the pseudo random number (PRN) code chips (±1) for that satellite, is the navigation data modulation bits (±1), n(t) is an additive white Gaussian bandpass noise, $f_0$ is the nominal carrier frequency, $f_d$ is the unknown frequency offset mainly due to Doppler, and $\phi_0$ is the initial unknown carrier phase.

Many receivers designed to receive GPS signals determines the presence of a GPS signal by the following decision:

$$S_i(T, \Delta t, \Delta f) = \left\| \int_t^{t+T} S_i(T) C_i(T-\Delta t) e^{j2\pi(f_0+f_d+\Delta f)T} dT \right\| < \text{Threshold}$$

where $\Delta t$ is the local code time alignment error, $\Delta f$ is the local carrier frequency error, T is the predetection integration interval (typical 1 ms and possible up to a data bit of 20 ms). The resulting baseband signal power $S_i^2 = I_i^2 + Q_i^2$ has the following in-phase and quadrature components:

$$I_i = AM \frac{\sin(\pi \Delta fT)}{(\pi \Delta fT)} R(\Delta t) D_i \cos(\Delta \phi_i)$$

$$Q_i = AM \frac{\sin(\pi \Delta fT)}{(\pi \Delta fT)} R(\Delta t) D_i \sin(\Delta \phi_i)$$

where M is the number of samples in the integration period T, $\Delta \phi_i$ is a constant phase error, $R(\Delta t)$ is the normalized correlation function that has a triangular shape with its peak at $\Delta t = 0$ and a base of 2 chips wide, and $\sin(\pi \Delta fT)/(\pi \Delta fT)$ is the loss factor due to the frequency error $\Delta f$.

Conventional receivers attempt to find the unknown time error $\Delta t$ and frequency error $\Delta f$ by searching through the time uncertainty interval $\Delta T$ and frequency uncertainty interval of sequentially in the acquisition mode. Sequential search with one code phase and a Doppler frequency at a time, is both timing consuming and slow.

Some newer designs utilize "hard" parallelism for code search in that massive physical correlators are used in parallel. Others attempt to use "soft" parallelism in that fast algorithms are run over a data segment many times for different search parameters. The use of Fast Fourier Transform (FFT) to implement correlation is an example of soft parallelism. Though being straightforward to the short cyclic C/A code, an FFT-implemented correlation is not trivial to a very long code sequence such as P(Y)-code and special techniques have to be used. An example of the use of an FFT-implemented correlation is described in related patent application Ser. No. 09/294,221, entitled, Device And Method For Rapidly Obtaining Direct Acquisition Of A Long Code Sequence In A Spread Spectrum Transmission which has already been incorporated into this disclosure by reference.

As will later be described in more detail, the present invention system and method adopt the FFT-based approach to search all code phases at the same time and to create a complete correlation function. Statistically, it is likely that the time spacing of the correlation function is about one half of a code chip. Since an ideal code correlation has a triangular shape spanned over two code chips, an interpolation technique can be employed to find the location of the true correlation peak. Further, since the correlation function shape may be distorted by multipath, particularly in the late side, multipath estimation and mitigation techniques can be applied prior to locating the peak value.

Conventional GPS receivers, as well as earlier frequency-domain approaches, employ the sequential Doppler search technique in the time domain. That is, the incoming code sequence is multiplied by the sine and cosine of a Doppler frequency selected from a set of bins covering the entire frequency uncertainty. Every Doppler-adjusted incoming code is then correlated sequentially with the replica code.

To further reduce computations, the present invention sets forth a method to perform a frequency-domain Doppler search process. It is based on the property that time-domain complex exponential multiplication is equivalent to frequency-domain spectral shifting:

$$\exp(j2\pi f_d t) g(t) \Leftrightarrow G(f - f_d)$$

where $G(f)$ is the Fourier transform of $g(t)$. With this technique, the incoming code segment is only FFT-processed once, but the entire frequency uncertainty is searched through frequency. This frequency shifting is computationally much less expensive than conventional sequential multiplication. The spectral shifting also provides a means to track a wide range of Doppler excursions particularly in a high dynamic environment.

The frequency domain Doppler removal thereby provides a means for parallel search. The Doppler removal can be achieved through shifting of the incoming signal spectrum or the local replica spectrum. The shifting range can be set large enough to cover the entire frequency uncertainty. Shifting of the spectrum up and down by one frequency bin corresponds to the removal of ±1T Hz. If a finer frequency shifting is required, a time-domain zero-padding before taking the FFT or a frequency-domain interpolation technique can be used. However, to obtain an even finer frequency, a vernier frequency estimation step can be taken. After the despreading integration, the output only contains residual Doppler component modulated with data bits. At this rate, the selection of the number of samples and the resulting frequency resolution is less restrictive. A discrete Fourier transform (DFT) can be used as a bank of bandpass filters to pick up the residual Doppler and add up the integration over a longer interval. Although the vernier frequency estimation step can significantly reduce frequency resolution, due to $\sin(x)/x$ shape of the frequency response, an interpolation technique can also be applied to locate the true frequency.

In contrast to conventional receivers that attempt to lock onto the code phase and carrier phase with one-value point tracking loops, the present invention generates a two-dimensional map of the correlation power as function of the delay time (pseudo range) and Doppler frequency (range rate). Since the time-frequency map covers all the Doppler frequency shift and all code phase, any present GPS satellite signal of reasonable strength can be captured. The difference between acquisition and tracking disappears. As a result, the method of present invention can operate in very high dynamics without the need for external aiding. The interpolated values for time and frequency can be averaged over a longer time period to further smooth out noise. A dynamic model can be also applied to enhance such smoothing.

The transform-domain approach utilized by the present invention method and system generates the spectra of the incoming signal and the correlation function. This allows for natural insertions of spectral and cepstral filtering techniques to suppress continuous wave (CW), narrowband, and even wideband interference. Further, the production of the entire correlation function as a natural step permits the application of methods for multipath parameter estimation and multipath mitigation. The two-dimensional time-frequency maps of correlation generated by the before mentioned method steps can then be used in an integrated manner to derive the user's position and velocity in a properly selected coordinate system such as the earth-center and earth-fixed (ECEF) frame or a local level north-pointing frame.

Referring to FIG. 1 an exemplary schematic of a high-dynamic fast-acquisition interference-suppressing receiver 10 is shown in accordance with the present invention. The receiver 10 utilizes an antenna 12 captures GPS signals that are transmitted by various GPS satellites. The GPS signals received by the antenna 12 are analog. The antenna 12 is coupled to a radio frequency (RF) front-end 14. The received analog signal is filtered in the RF front-end 14 which converts the GPS signal from an L1 carrier at 1575.42 MHz down to a suitable intermediate frequency (IF) at several MHz. The IF signal is then sampled and quantized and passed over to a baseband processor 20.

An oscillator 16 provides the frequency source for frequency down conversion and analog to digital conversion. The oscillator 16 may also be used to drive digital signal processors (DSPs) that are part of the baseband processor 20. The oscillator may also serve as a local time base for time-tagging, measurement interrupt, and other timing and synchronization purposes.

The baseband processor 20 is organized into functionally identical channels, each dynamically assigned to a different GPS satellite being received. To simplify, only four of such channels 20a, 20b, 20c, and 20d are illustrated in the figure.

FIG. 1 illustrates a novel method to construct the baseband processor 20 having high dynamic capability, fast-acquisition, and interference-suppressing feature. The baseband processor 20 perform four essential function that are represented by four blocks. The first function is the time tagging and transformation of the incoming signal received from the RF front end 14. This is shown as Block 22 in FIG. 1. The second function of the baseband processor 20 is the delay doppler mapping of the tagged and transformed incoming signal. This is shown as Block 24 in FIG. 1. The third function is the integration, extraction and management of the needed signal parameters. This is shown as Block 26 in FIG. 1. Lastly, the fourth function of the baseband processor is the generation of a replica for use in the delay doppler mapping. This is shown by Block 28 in FIG. 1. The components of each of these boxes are later described with reference to subsequent figures.

The GPS signal parameters obtained by the baseband processor 20 are combined in an integrated navigation processor 30, which accepts commands from and presents the navigation data to the user via a user interface 32.

Figure 2:
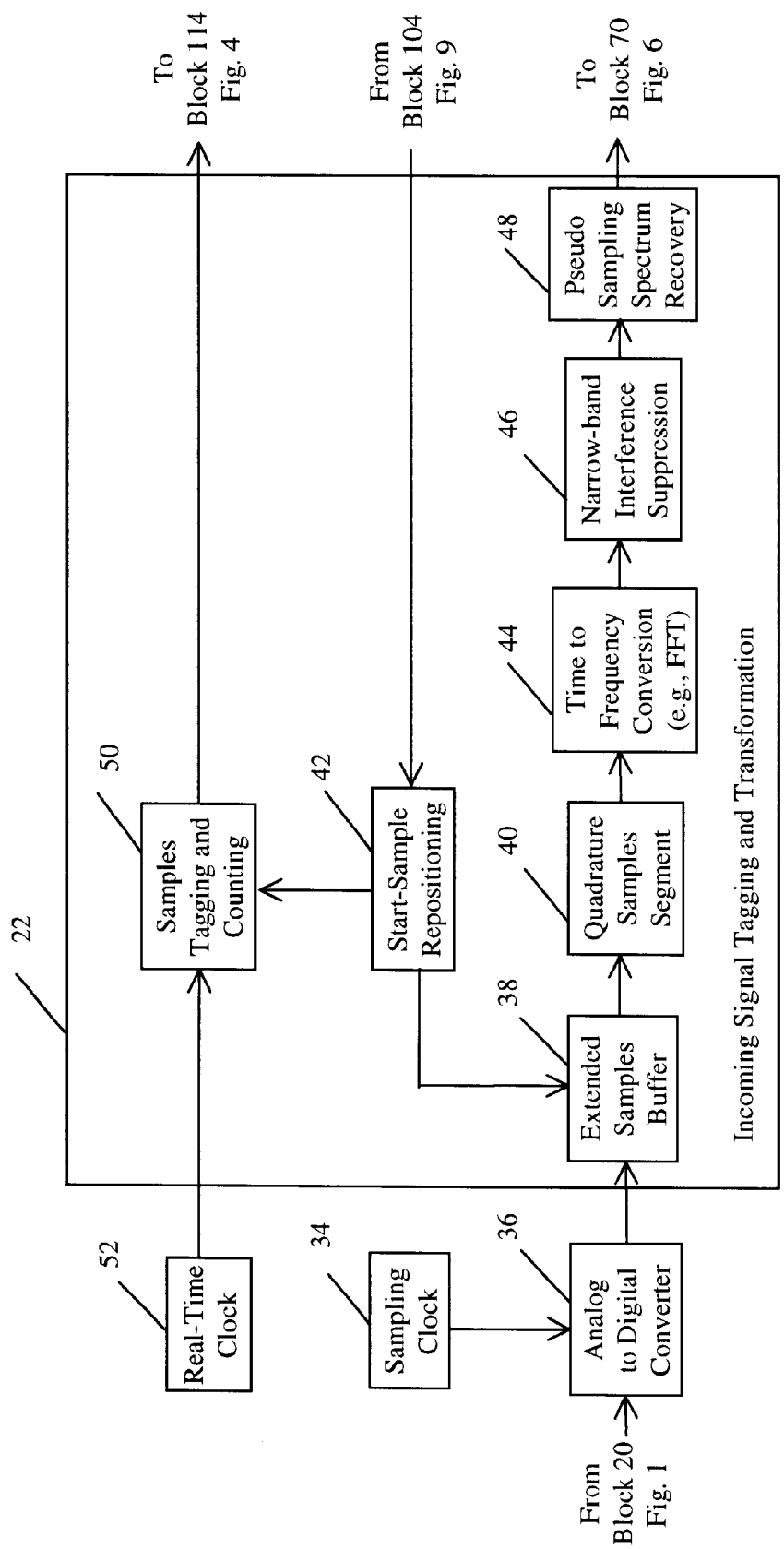
FIG. 2 is a schematic of an exemplary embodiment of an incoming signal transformation and time-tagging process in accordance with the present invention.

Referring to FIG. 2, the details of the incoming signal time-tagging and transformation block 22 (FIG. 1) can be explained. The oscillator 16 (FIG. 1) provides a sampling clock 34. The IF signal from the radio signal (RF) front end 14 (FIG. 1) is sampled and quantized by an analog to digital converter 36, thereby producing digital samples. The digital samples of the incoming signal are temporarily stored in an extended samples buffer 38. In a typical implementation, the size of the extended samples buffer 38 can be selected to be twice that of a correlation interval. For example, consider a GPS C/A code whose cycle is 1023 chips-long with a chipping rate of $1.023 \times 10^6$ chips per second (1.023 Mcps). When the signal is sampled at $2.048 \times 10^6$ samples per second (2.048 Msps), the number of samples per correlation interval is 2048 over 1 ms. Accordingly, the buffer size for each correlation interval is to hold 4096 samples. To maintain a turn-around time, a double buffer or a circular buffer may be needed depending upon the speed of real-time processors. Complex samples will double the total number of bytes required by real samples.

In-phase and quadrature components for a correlation interval are read out from the extended samples buffer 38 to a quadrature samples segment 40. The extended samples buffer 38 is indexed by a start-sample repositioning process 42, which will later be explained when discussing FIG. 3. The quadrature samples are then converted from the time domain to the frequency domain via the Fast Fourier Transform or FFT process 44. Once in the frequency domain, the frequency transform can be further processed by the use of a narrowband interference suppression process 46. To extract the original signal spectrum, a pseudo quadrature sampling spectrum recovery process 48 is performed. An example of such a recovery process is disclosed in the paper "GPS Code Correlation With FFT Under Pseudo Quadrature Sampling" presented by the inventor at the Institute Of Navigation National Technical Meeting in Anaheim, Calif. in January 2000.

The mechanism of re-positioning the starting sample for each correlation interval is significant in that it provides a means to delimit and align the boundary of millisecond, data bit, and second in the incoming signal samples. Without such an alignment, a data bit sign reversal among the samples of one correlation interval can reduce and even nullify the correlation power. The starting sample alignment is indispensable to obtain the data bit sync and the subsequent frame sync for navigation data demodulation. It is also imperative for the generation of a one-pulse-per-second (1pps) output.

Figure 3:
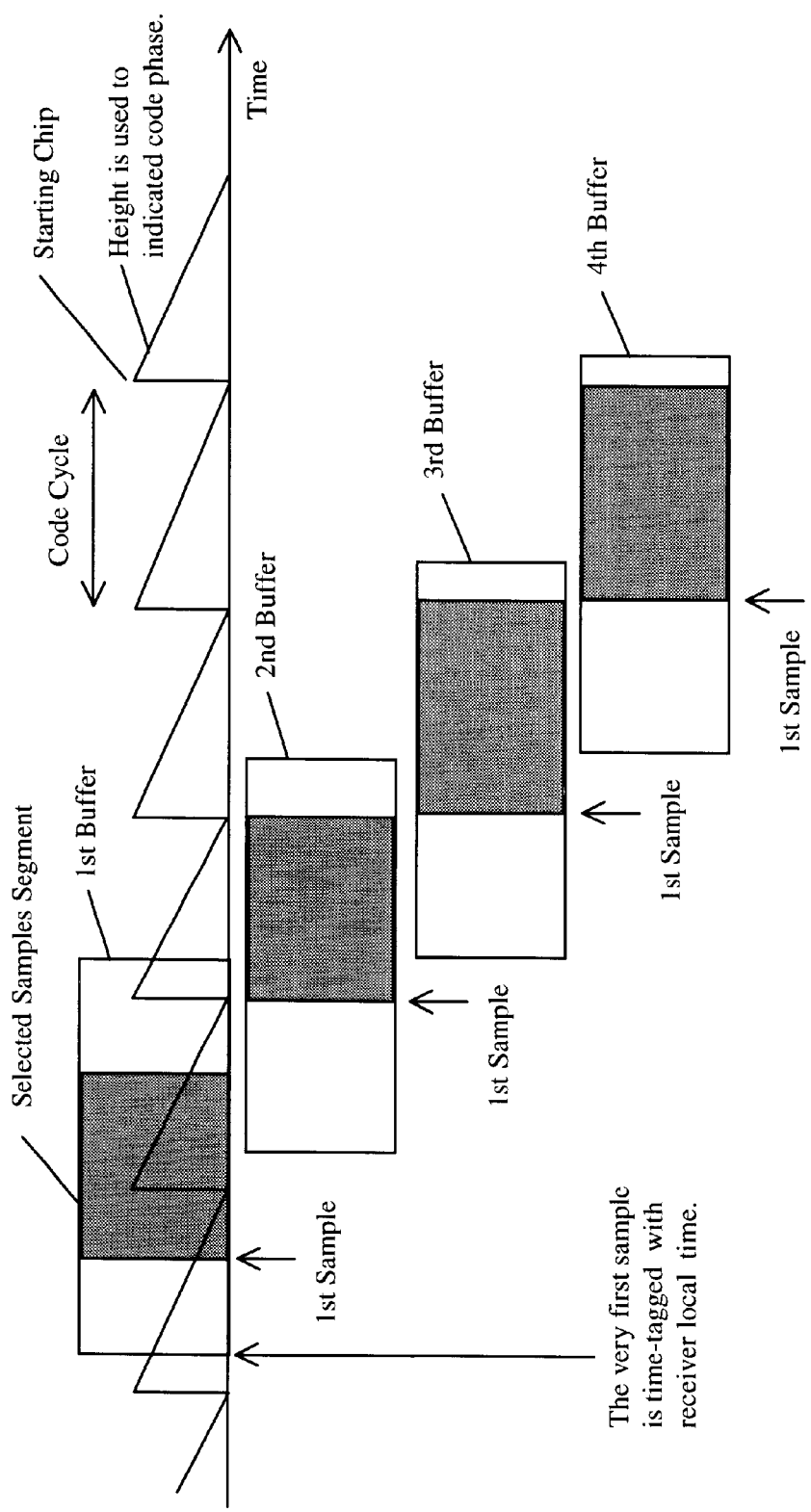
FIG. 3 is a graphic representation of the method steps of a start-sample repositioning and time tagging process in accordance with the present invention.

An exemplary start-sample repositioning process (indicated as Block 42 in FIG. 2) is graphically shown in FIG. 3. The incoming samples continuously fill into the extended sampled buffer 38 (FIG. 2) in a first-in, first-out (FIFO) manner. About half of the samples are selected from the extended sampled buffer for subsequent processing. The sample closest to the starting chip in the code cycle is picked up. Except for the turn-on operations, the location of the first sample within the buffer is given by the correlation power detection in the integration, extraction, and management block 28 (FIG. 1). The buffer acts like moving a sliding window along the time axis and adjusting the looking-through glass of the window to see a complete code cycle each time a look is taken.

Referring back to FIG. 2, each sample in the extended samples buffer 38 is counted and time-tagged with the receiver local time by a samples tagging and counting process 50. The local time can be either in the UTC time format or GPS time format. To establish the local time, in the simplest case, one read of the real-time clock 52 for the very first sample is needed at the beginning of the operation as the starting point of the local time base. All subsequent samples can be time-tagged by adding up the nominal sampling interval. The time-tag is sent to the integration, extraction, and management process (Block 28, FIG. 1) as the arrival time of the incoming signal.

Because the local timing error is estimated as part of the navigation solution, the accuracy requirement of the real-time clock 52 can be relaxed. Both the counting and tagging can be effected in software. In addition, simple hardware counters may be used to time-tag an external interrupt signal used as the clock for GPS signal measurement-taking. These same counters can be used to generate a precise one pulse per second (1pps) output signal, or to produce other timing and synchronization signals.

As can be seen from FIG. 2, the rate of the sampling clock 34 is an important design parameter. A faster rate means more sampling points per unit time. This can lead to a finer time resolution for the subsequently calculated correlation function. But a faster rate also requires larger data storage for intermediate results and a more powerful processor to handle the throughput. The minimum sampling rate can be selected according to the Nyquist rate that is twice the fundamental frequency of the signal. One simple way to obtain quadrature samples is to select the last intermediate frequency to be exactly a quarter and an integer number of the sampling rate. The advantage of such an arrangement is that the local reference in-phase and quadrature components become sequences of alternative 0 and ±1. As a result, the consecutive incoming samples can be simply split into odd and even samples and paired as the in-phase and quadrature components without the need for mixing (multiplication with the local reference). Because two consecutive samples have a one-sample delay, this scheme is called pseudo quadrature sampling, and the in-phase and quadrature components may correspond to code chips of different polarity. To extract the original signal spectrum, additional processing is required in the pseudo sampling spectrum recovery process 48.

Figure 4:
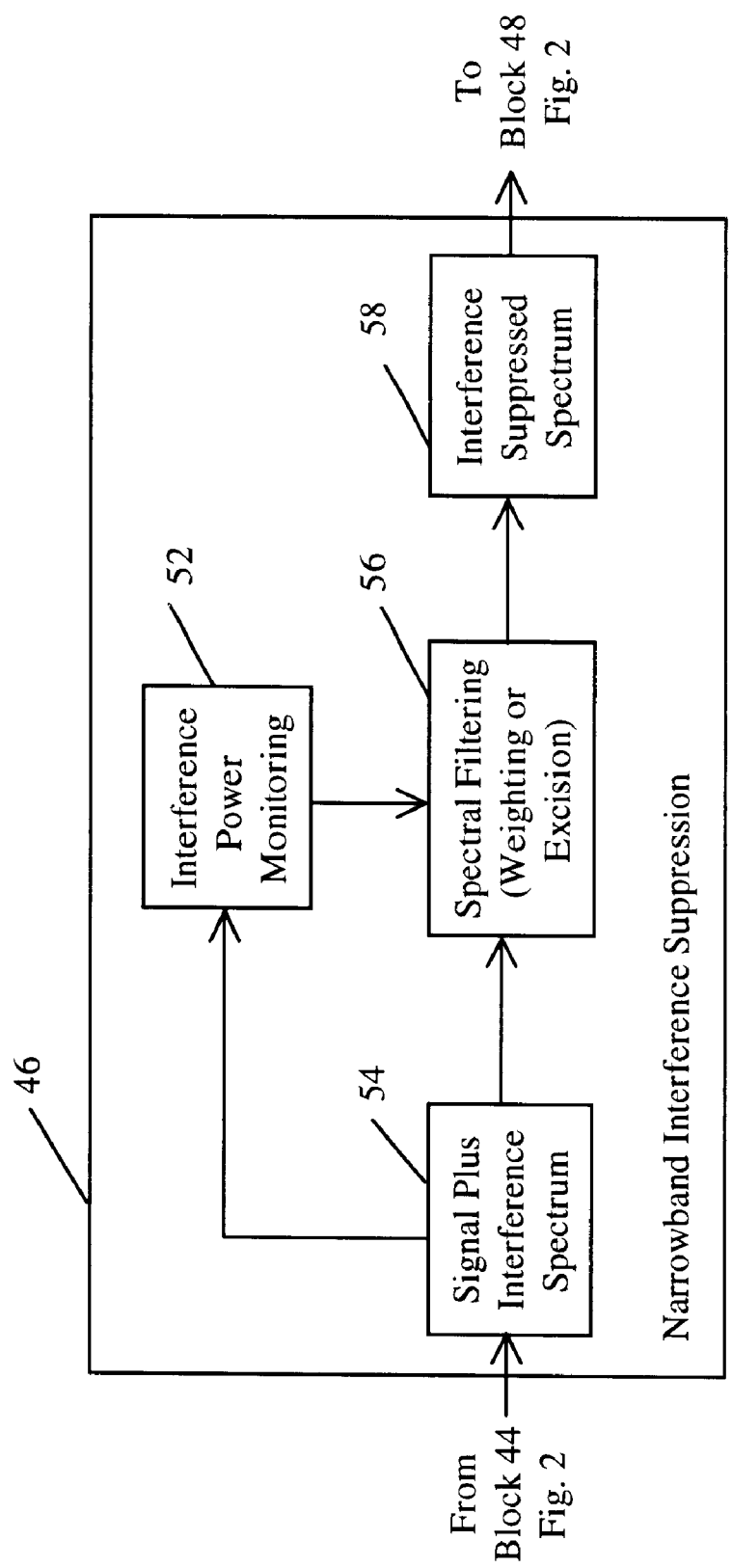
FIG. 4 is a schematic of an exemplary embodiment of a narrowband interference suppression process in accordance with the present invention.

Referring now to FIG. 4, an exemplary schematic of the narrow-band interference suppression process (Block 46, FIG. 1) is shown. The concept of frequency-domain interference suppression is based on the fact that the spread-spectrum GPS signal is buried below noise and any power rising above the noise floor is most likely originated from an interference source. As a result, the noise floor can be monitored and any sudden signal power increase within a narrow frequency band can be detected and then suppressed. The well-known Welch method can be implemented in an interference power monitoring process 52. The signal plus interference spectrum 54 is processed in a spectral filtering process 56 using either a weighting technique or an excision technique to produce an interference suppressed spectrum 58. The interference-suppressed spectrum 58 is then passed on for further processing.

Figure 5:
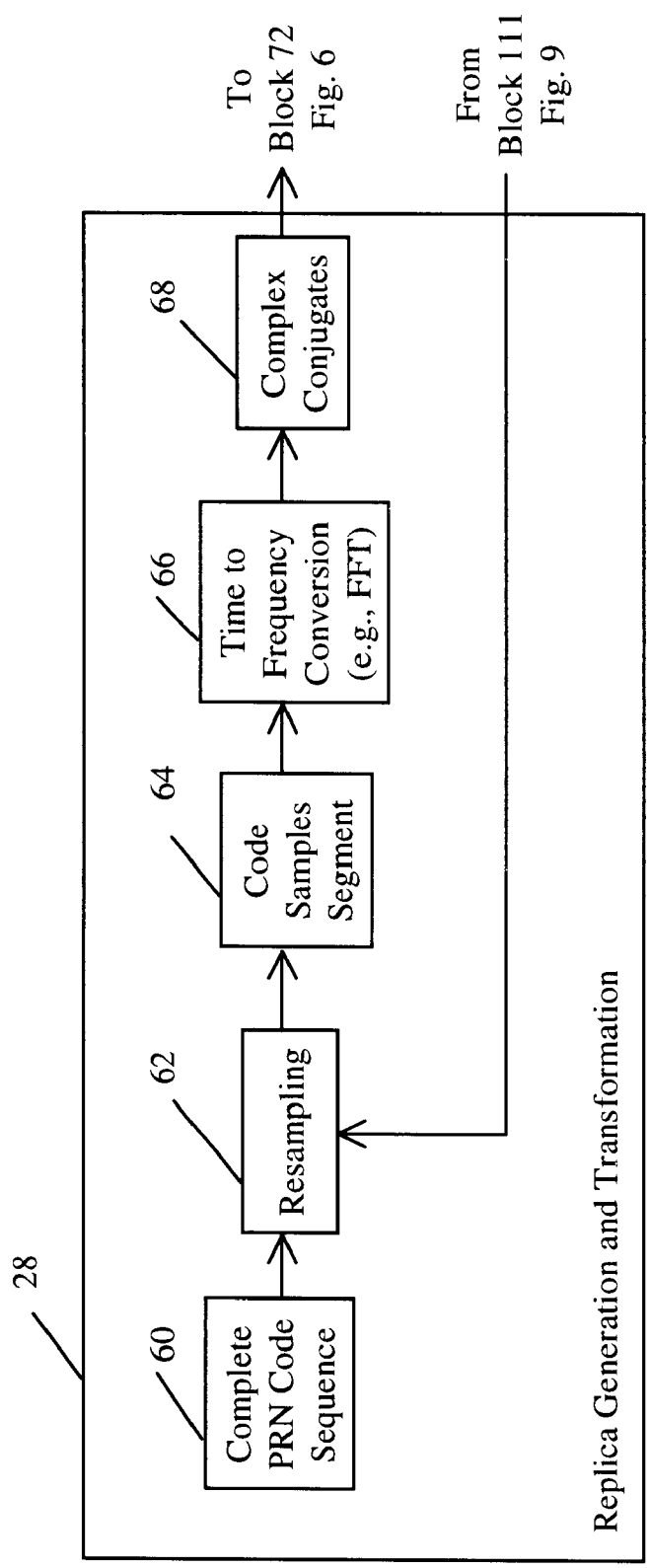
FIG. 5 is a schematic of an exemplary embodiment of a replica generation and transformation process in accordance with the present invention.

Referring to FIG. 5, an exemplary schematic of the replica generation and transformation process (Block 28, FIG. 1) is shown. Although it is possible to make use of a hardware code generator driven by a numerical control oscillator (NCO), FIG. 5 shows an alternative construct suitable for software implementation. The full-cycle complete pseudo range number (PRN) code sequence 60 for each selected satellite can be pre-computed and stored in the memory, with its first chip always aligned to the starting sample, thus being in sync with data bit and second boundary. To reproduce the Doppler effects which stretch and squeeze the code sequence, the method step of resampling 62 is applied with an Doppler estimate provided by the integration, extraction, and management process (Block 28, FIG. 1). However, this step may be by-passed if the small Doppler effect is not considered to simplify the overall operation. The resulting code samples segment 64 is formed. The time to frequency conversion process 66 can be identical to the process shown by Block 44 in FIG. 2. The complex conjugates 68 of the replica spectrum are thereby formed. The results are then sent for further processing.

Figure 6:
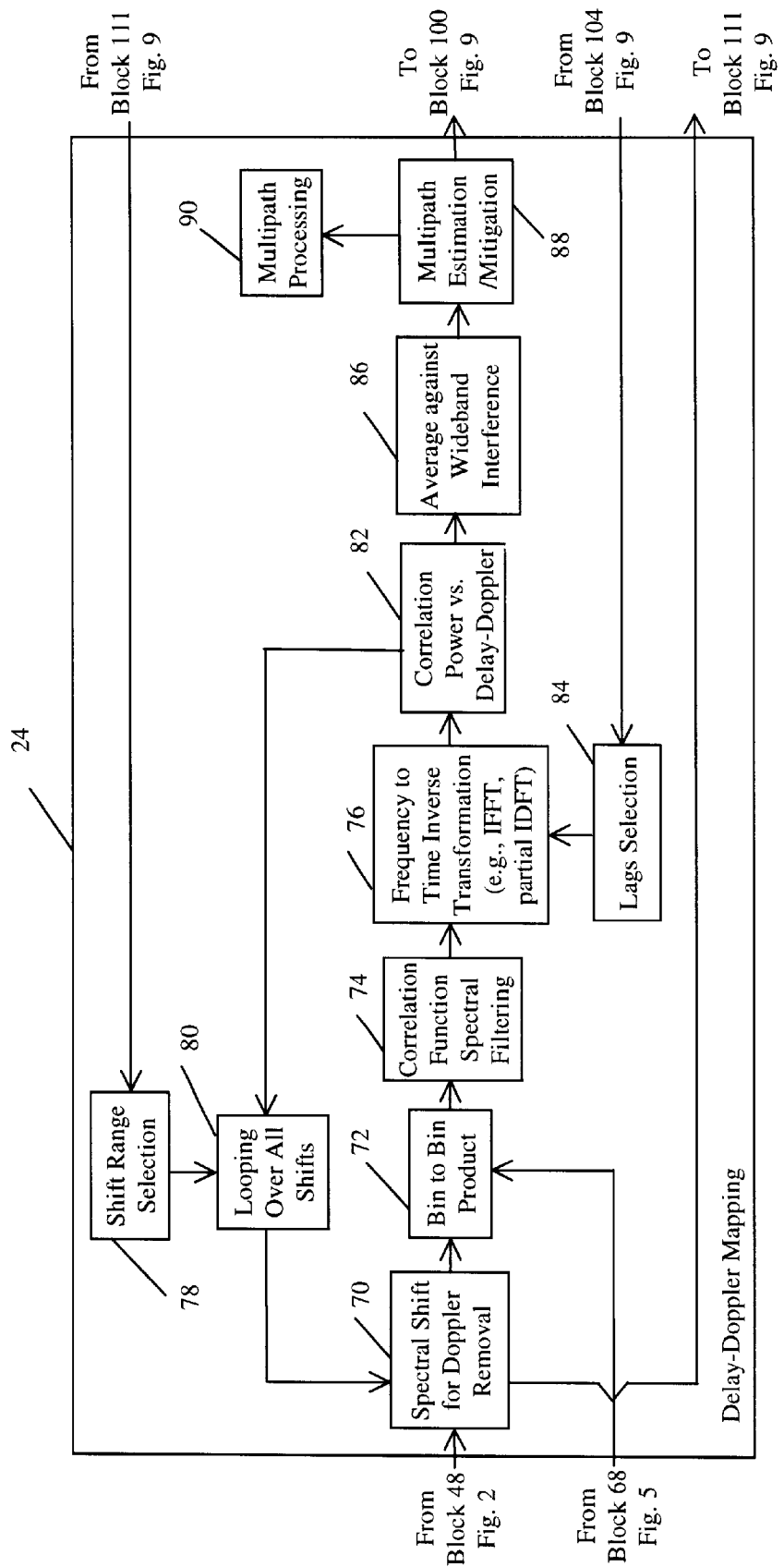
FIG. 6 is a schematic of an exemplary embodiment of a delay-Doppler mapping process in accordance with the present invention.
Figure 7:
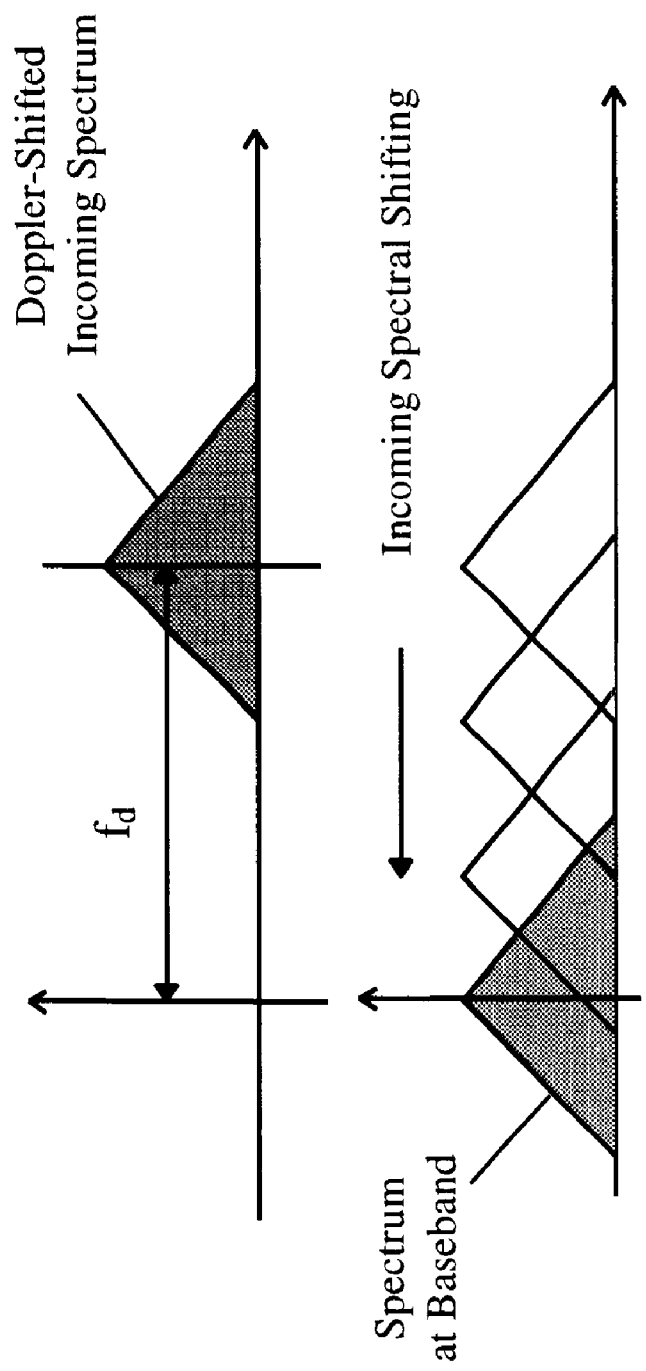
FIG. 7 is a graphic representation of the method step of spectral shift for Doppler removal in accordance with the present invention.

Referring to FIG. 6, an exemplary schematic of the delay-Doppler mapping process (Block 24, FIG. 1) is shown. The incoming signal spectrum is shifted along the frequency-axis toward the baseband in order to remove the presence of Doppler frequency shift. This is done in the spectral shift for Doppler removal, as is indicated by Block 70. The process is illustrated by FIG. 6. The process is based on the mathematical property that the multiplication of a time function by another complex exponential function is equivalent to the shift of the spectrum of the first function by a certain frequency specified by the second function. The time-domain multiplication used by conventional receivers behaves as phase rotation to remove Doppler. By its very nature, this time-domain operation is done sequentially, once for each frequency value. As a result, this sequential process is slow and time-consuming in the conventional acquisition mode, and its one-Doppler-value-a-time limits the dynamic responsiveness in the conventional tracking mode (see FIG. 8a). The spectral shifting method of the present invention solves both problems by allowing parallel Doppler removal and multiple-Doppler-values estimation (see FIG. 8b).

The Doppler-shifted spectrum of the incoming signal and the replica spectrum are multiplied in a bin-to-bin product 72 on a frequency-bin to frequency-bin basis. This results in the spectrum of the correlation function between the incoming signal and the local replica. If necessary, some spectral and cepstral filtering techniques may be applied to remove unwanted components in a correlation function spectral filtering process 74.

The correlation function spectrum is then converted back to the time domain via the Inverse Fast Fourier Transform or IFFT for instance in the frequency-to-time inverse transformation, as is indicated by Block 76. To each Doppler shift corresponds a correlation function for all possible time delays. This is a one-dimensional correlation power versus time delay. The Doppler shifting range is determined by a shift range selection process 78 with an estimated Doppler input. When the above process is repeated for all selected Doppler shifts as controlled by a looping over all shifts (Block 80), a two-dimensional map is formed by the correlation of power versus delay and Doppler (Block 82).

In the acquisition mode, a large number of Doppler shifts and time lags are specified to cover the entire time-frequency uncertainty plan to ensure a high probability of detection. Once a satellite signal is detected and a better knowledge of its time and frequency parameters is obtained, a smaller number of Doppler shifts and time lags can be used. The latter is effected by a lags selection process 84 with a time estimate input. The inverse transformation can be performed by the inverse discrete Fourier transform (IDFT) operated over selected time lags.

The delay-Doppler map of the correlation power can be further accumulated for a certain period of time in an average against wideband interference process 86. The accumulation before detection is equivalent to tightening up the noise bandwidth, thus increasing the signal processing gain. The integration interval can be made sufficient long to shut out the wideband interference. The delay-Doppler map can be further processed for multipath estimation and mitigation, as indicated by Block 88. Any deviation from the ideal shape of correlation function indicates the presence of signals from secondary paths. The multipath signals can be removed for better positioning with the main path signal. However, the multipath signals themselves can be used for many purposes other than positioning in the multipath processing, as is indicated by Block 90. Examples include remote sensing of geophysical parameters embeddedin reflected GPS signals.

Figure 8A:
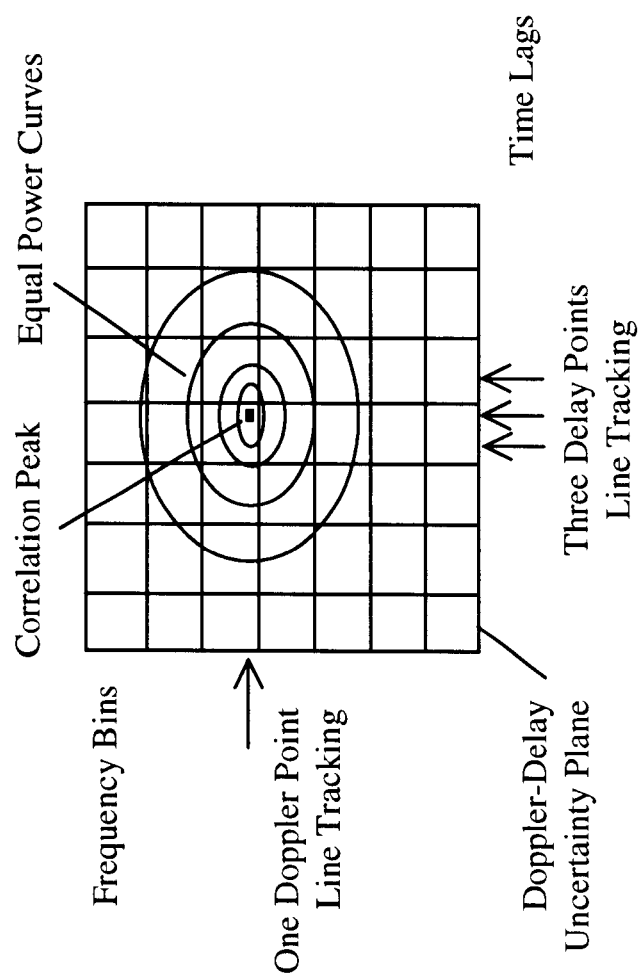
FIGS. 8a and 8b show a graphic comparison of the conventional point values line tracking (FIG. 8a) versus the proposed grid values area tracking (FIG. 8b) in the time-frequency uncertainty plan in accordance with the present invention.
Figure 8B:
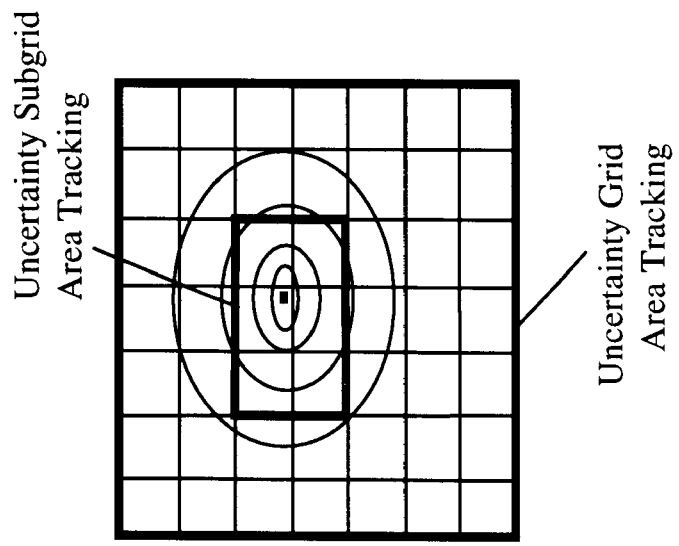

FIG. 8a and FIG. 8b illustrate a fundamental advantage of the present invention over conventional designs in high dynamic estimation of time-frequency parameters under interference. In conventional designs, a phase-locked loop or a frequency-locked loop is used to track the incoming carrier. This type of tracking mechanism can only provide a single frequency value to phase-rotate the incoming signal to baseband, as shown in FIG. 8a. Besides, the responsiveness of the tracking loop is usually traded off for noise performance. When a sudden acceleration and jerk occurs in a high dynamic environment, the conventional receivers usually cannot respond promptly due to the sequential nature of its frequency estimation and phase rotation, and the tracking errors can quickly develop. This can lead to the loss of signal lock. The code tracking loop in conventional receivers typically follows three time delays with the so-called early, prompt, and late correlators, as shown in FIG. 8a. Some receivers may have a dozen of such correlators. Although the code delay-locked loop is less sensitive to sudden dynamics, the loss of carrier tracking soon leads to that of code tracking.

The tracking mechanism in accordance with the present invention differs from conventional methods in three aspects. First, it provides a grid coverage in contrast to conventional point coverage. In other words, multiple delay and Doppler values are estimated at the same for each signal segment. This is made possible by the two-dimensional delay-Doppler mapping of correlation power using the frequency-domain implementation of correlation and spectral shift for Doppler removal set forth in this invention. Secondly, the tracking of the incoming signal time and frequency parameters can be performed in either an open-loop manner or a quasi-open loop manner in contrast to the conventional single-value closed-loop approach. Conventional approaches are built upon small-error linearized models and as a result, they have to adjust the local replica signal in a closed loop manner to match the incoming signal in order to keep the assumption valid. Since the entire uncertainty plan of the incoming signal is covered in the proposed approach as shown in FIG. 8b, there is no need to modify the local replica signal, and the time and frequency parameter estimation can be done in an open-loop manner. Open-loop eliminates the bandwidth requirement and instability problem. Nevertheless, to further reduce the computation load, a smaller grid coverage may be used, as is shown in FIG. 8b. Although the estimation is still done in an open-loop manner, a smaller grid may be placed around the predicted time-frequency point in the uncertainty plan to effectively cover possible excursions of the incoming signal parameters. Since feedback is used, the approach is termed as a quasi-open loop. When the present method is used as a means to provide time-frequency errors, it can be used in a more general sense as error discriminants to drive closed-loop tracking systems. Thirdly, the same delay-Doppler mapping process can be used for both acquisition and tracking modes in contrast to conventional methods which require different software (and hardware) for different operation modes and their transitions.

Figure 9:
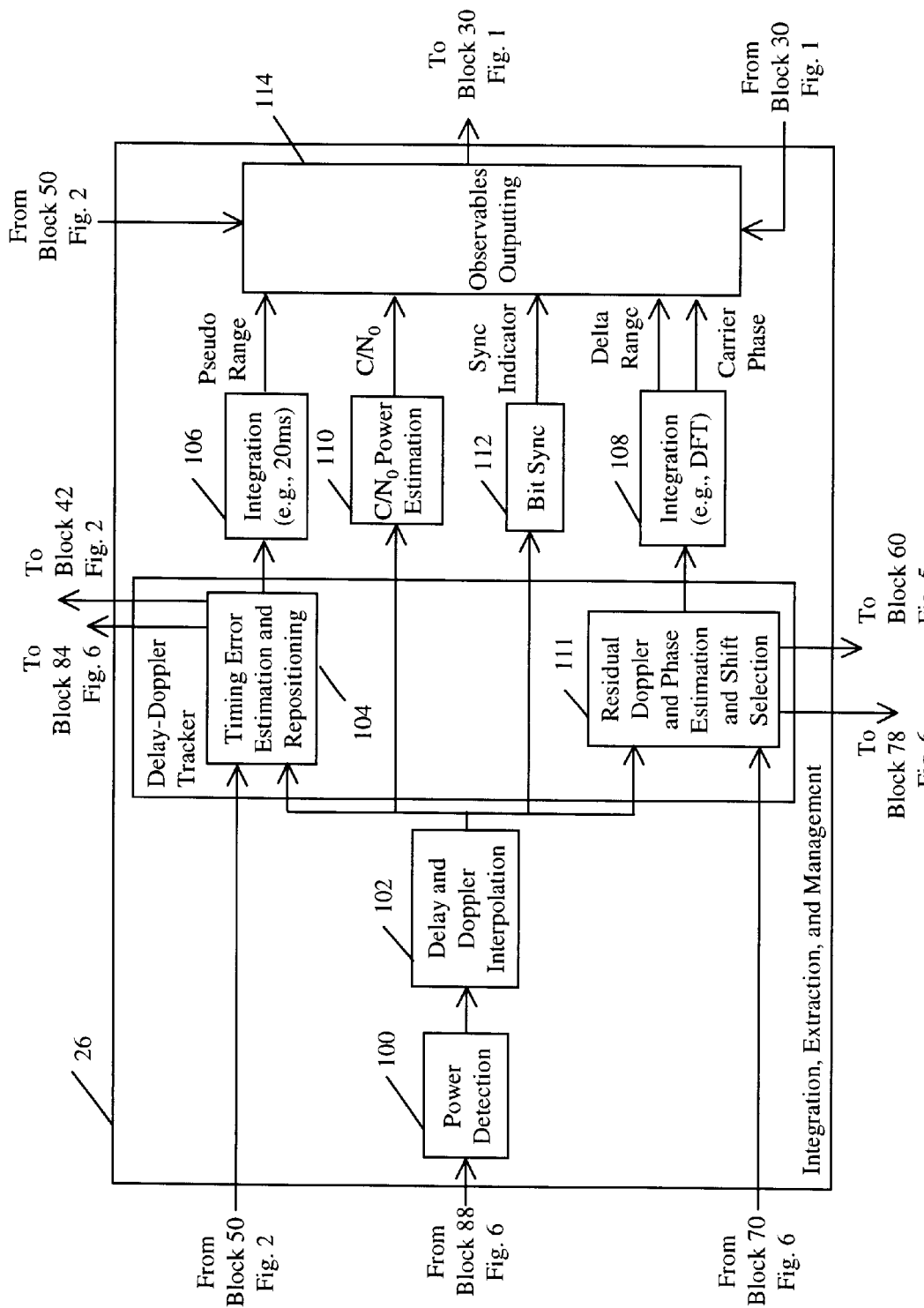
FIG. 9 is a schematic of an exemplary embodiment of the method steps of integration, extraction, and management in accordance with the present invention.

Referring to FIG. 9, an exemplary schematic of the integration, extraction, and management block is shown. Three major operations are conducted here, as implied by its name. The first operation is the accumulation of time and frequency parameters over one data bit interval (20 ms) or more for a better signal to noise ratio. The second operation is the extraction of signal time-frequency parameters and embedded navigation data bits. Finally, the third operation is the management of the incoming sample repositioning, delay lag selection, replica resampling, and Doppler shift selection.

Figure 10A:
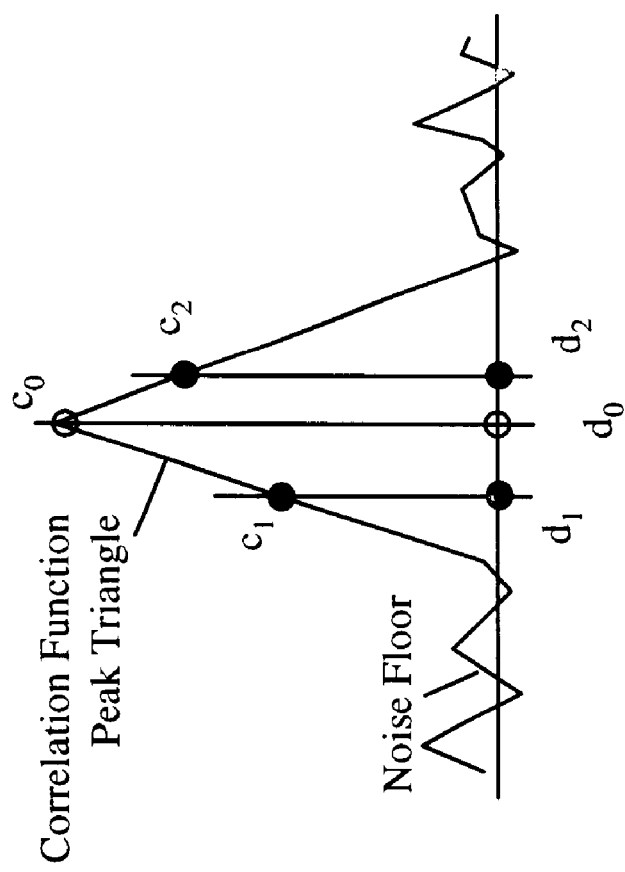
FIG. 10a is a graphic representation of the method step of time interpolation for a better delay estimate in accordance with the present invention.
Figure 10B:
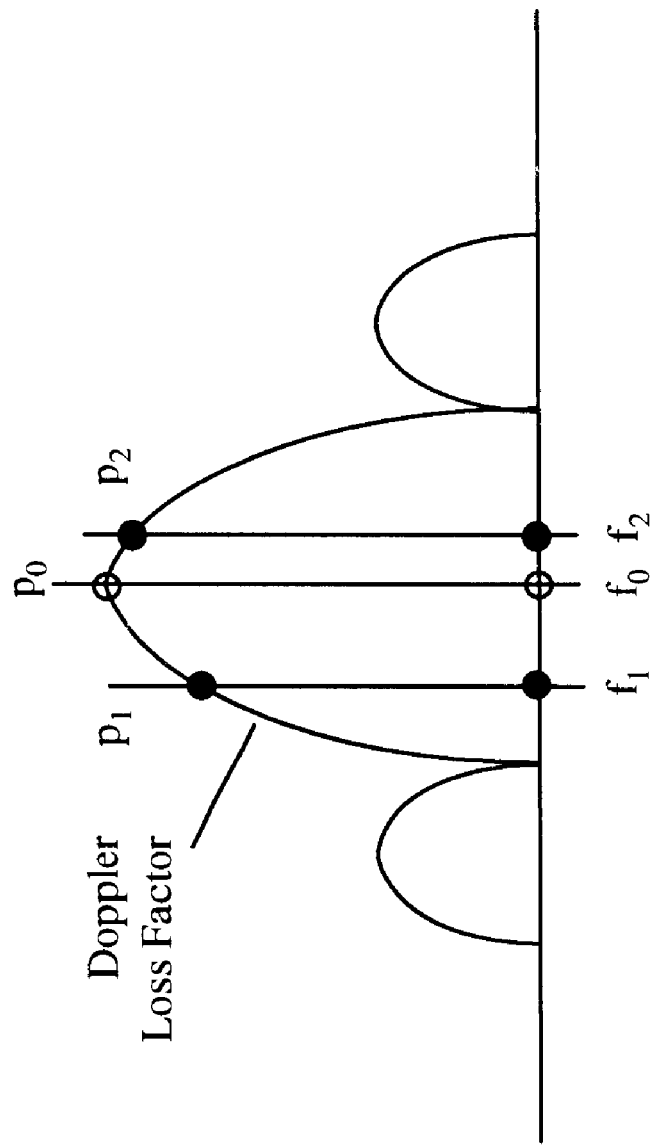
FIG. 10b is a graphic representation of the method step of frequency interpolation for a better Doppler estimate in accordance with the present invention.

A threshold-based power detection process 100 is applied to the delay-Doppler maps. Once the presence of a signal is detected, a delay and Doppler interpolation process 102 is started. Referring briefly to FIG. 10a, a graphic representation of one possible interpolation technique is shown. The interpolation technique is used to find the value and location of the correlation power $(c_0, d_0)$ from two adjacent delay measurements $(c_1, d_1)$ and $(c_2, d_2)$. Both analytic and iterative methods can be used. Similarly, FIG. 10b is a graphic representation of one possible interpolation technique to find the value and location of the correlation power $(p_0, f_0)$ from two adjacent Doppler shift measurements $(p_1, f_1)$ and $(p_2, f_2)$. Both analytic and iterative methods can also be used.

Returning now to FIG. 9, the interpolated location of the correlation peak represents the time at which the signal is transmitted from the GPS satellite with an ambiguity of multiple 1 ms for C/A-code but not ambiguous for P(Y)-code. This ambiguity can be resolved once the subsequent navigation data bit sync and frame sync are achieved. Together with the time tag which represents the local time at which the signal arrives at the receiver, the signal travel time from the satellite to the receiver is obtained in a timing error estimation and repositioning process 104. The propagation time multiplied by the speed of light leads to a pseudo range which is further averaged in an integration process 106 to further filter out noise. The interpolated location of the correlation peak can be decomposed into an integer part and a fractional part. The integer part is provided by the timing error estimation and repositioning process 104 to the start-sample repositioning block 42 (FIG. 2) to reposition the first sample in the extended samples buffer 38 (FIG. 2). This integer is also provided to the lag selection 84 (FIG. 6) to shrink the grid tracking area.

The interpolated location of correlation power is used by the residual Doppler and phase estimation and shift selection block 111, together with the selected Doppler shift from Block 70 (FIG. 6), to construct the total Doppler shift frequency. The real and imaginary parts of the correlation peak also contain the information of the initial phase at the start of this integration interval. Both the Doppler estimate and the initial phase can be accumulated in an integration process 108 to form delta range and carrier phase. The Doppler estimate is provided to the resampling block 63 (FIG. 3) to adjust the sampling rate of the local replica. It can also be provided to the shift range selection block 78 (FIG. 6) to reduce the scope of Doppler search.

As an alternative to simple summation, a discrete Fourier transform (DFT) can be used in the integration process 108 to add up the segmented correlation power over a large time interval. The DFT serves as a series of bandpass filters and it can remove any residual Doppler left in the correlation power, thus providing a further refined estimated of Doppler shift frequency.

In a $C/N_0$ power estimation process 110, the incoming carrier to noise density ratio $(C/N_0)$ is computed. In case without the knowledge of the thermal noise floor and RF front-end calibration, a pair of wideband and narrowband power estimators can be implemented, from which the desired $C/N_0$ can be derived as an indication of the incoming GPS signal strength.

Once each integration interval is aligned to the cyclic code sequence, the boundary of every 1ms is known. The data bit transition is then determined in a bit sync process 112. Since each data bit interval is 20 ms, one simple way to achieve the bit sync is to run in parallel twenty moving sums of 20 ms long, each is started 1ms later than its predecessor. The running sum that has consistently the largest absolute value represents a synchronized data bit interval.

An observable outputting process 114 puts all the signal time-frequency parameters and navigation data bit information into a predefined format and sends it over to the integrated navigation processor 30 (FIG. 1). The observable outputting can be done on a regular basis by a software clock or a hardware counter or under request through an interrupt from the navigation processor 30 (FIG. 1). Each observables-taking event is tagged with the receiver local time as part of the output message.

Although the description above contains many specificities, these should not be construed as limiting the scope of the invention but as merely providing illustrations of some of the presently preferred embodiments of this invention. For example, the present invention provides a generic signal processing architecture of versatility where many processing blocks can be tailored to achieve a desired combination of functionalities. Some time-domain and frequency-domain processing blocks are complementary for one application but redundant for another. As a result, some blocks may be made optional and others are omitted. Flexibility is also provided for design parameters tradeoff to best suit a particular application. Further, timing signals can be added to facilitate integration with external sensors such as an inertial measurement unit (IMU) or an inertial navigation system (INS). Although the digital methods with FFT and DFT have been described for domain conversions in the preferred embodiment, other means such as optoacoustic devices and Fourier optics can also be used. Reference has been made mostly to the GPS C/A code but the present invention is equally applicable to the P(Y)-code or other new codes which may be modulated onto the GPS carriers.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. In a navigational system utilizing a plurality of satellites that transmit radio-frequency signals embedded with time and frequency parameters, a method of obtaining navigational fixes in the presence of interference, comprising the steps of:

receiving the radio-frequency signals from a plurality of the satellites;

converting the radio-frequency signals received to a predetermined intermediate frequency with a band-limiting amplifying gain, thereby producing converted signals;

generating a local replica code;

processing said converted signals to form a delay-Doppler map of correlation power between the converted signals and said local replica code;

utilizing said delay-doppler map to extract navigation data and both time and frequency parameters; and combining said navigation data and said time and frequency parameters from said plurality of satellites to produce a navigation solution.

2. The method according to claim 1, wherein said step of processing said converted signals to form a delay-Doppler map of correlation power further includes the substeps of:

generating a code replica sequence spectrum;

obtaining the complex conjugates of the code replica sequence spectrum;

sampling said converted signals and tagging samples of said converted signals with a local time code;

forming a two-dimensional map of correlation power calculated from said code replica sequence and the tagged samples.

3. The method according to claim 2, further including the substep of extracting time-frequency parameters from each said two-dimensional map that have been cumulated over a predetermined time period.

4. The method according to claim 2, wherein said substep of obtaining the complex conjugates of the code replica sequence spectrum, includes;

generating a complete code sequence for each available satellite;

resampling the code sequence according to the given Doppler frequency estimate;

converting the code replica sequence to a frequency domain; and taking the complex conjugates of the converted code replica sequence spectrum.

5. The method according to claim 2, wherein said substep of sampling said converted signals and tagging samples of said converted signals with a local time code, includes:

tagging each incoming sample with the receiver local time and storing the tagged samples in an extended samples buffer;

repositioning the start sample within the extended samples buffer according to the estimated location of a correlation peak.

6. The method according to claim 5, further including the substeps of:

suppressing any narrowband interference if present from the incoming spectrum by spectral filtering methods; and using a pseudo quadrature sampling scheme to form in-phase and quadrature samples.

7. The method according to claim 2, wherein said step of sampling said converted signals and tagging samples of said converted signals with a local time code further includes:

establishing the local time base starting point by reading from a local real-time clock; and maintaining the local time base by adding up each interval used in sampling.

8. The method according to claim 6, wherein said step of suppressing any narrowband interference further includes:

monitoring the converted signals for any sudden power surge above an average noise level; and filtering the converted signals if such a surge is detected.

9. The method according to claim 2, further including:

shifting said converted signals up and down circularly along a frequency axis, thereby creating a shifted incoming spectrum;

multiplying the shifted incoming spectrum with said code replica spectrum on a bin-to-bin basis to form a correlation function spectrum;

filtering the correlation function spectrum;

converting said correlation function spectrum from frequency-domain back to a time-domain to form the delay-Doppler map of correlation power;

cumulating the delay-Doppler maps of correlation power over a time period, made sufficient long by the given data bit sign, to narrow the equivalent noise bandwidth against wideband interference; and detecting the presence of multipath signals from the correlation function spectrum to estimate multipath parameters for mitigation and processing.

10. The method according to claim 9, wherein said step of shifting said converted signals up and down circularly along a frequency axis further includes looping through a selected Doppler shift range.

11. The method according to claim 9, further including:

performing inverse discrete Fourier transforms for selected time lags to form a delay-Doppler sub-map of correlation power.

12. The method according to claim 2, wherein said substep of extracting time-frequency parameters from each said two-dimensional map that have been cumulated over a predetermined time period, further includes:

detecting the presence of said signal by threshold testing;

interpolating delay and Doppler estimates to a predetermined resolution;

generating a pseudo range measurement from an interpolated delay estimate and a local time tag;

generating a delta range measurement from the interpolated Doppler estimate and the selected Doppler shift; and generating a carrier phase measurement from an interpolated complex correlation power and the estimated Doppler frequency.

13. The method according to claim 12, further including the steps of:

generating an estimate of carrier to noise density ratio;

achieving a navigation data bit sync based on a series of correlation values; and formatting a time tag, pseudo range, delta range, carrier phase, carrier-to-noise ratio, and bit sync into a pre-specified set of observables.

14. The method according to claim 12, further including:

integrating the pseudo range measurements over at least a data bit interval;

taking an integer part of an interpolated location of the correlation peak to reposition a first-sample of the incoming sample segment; and specifying a reduced range of delay lags for inverse transformation of correlation function from the frequency domain to the time domain.

15. The method according to claim 12, further including:

integrating the delta range measurements over at least a data bit interval;

converting a Doppler frequency estimate into a replica code resampling rate; and specifying a reduced range of Doppler shifts for the frequency-domain Doppler removal from the converted signals.

16. A receiver for receiving signals from satellites that are part of the global positioning system, said receiver including:

an antenna;

a radio frequency front-end that receives satellite signals from the satellites via the antenna, wherein said radio frequency front-end band limits the signals and converts the signals to an intermediate frequency;

a baseband processor containing a plurality of functionally identical channels, wherein a separate channel is dynamically assigned to each signal of a different satellite and each functionally identical channel determines navigation data and both time and frequency parameters embedded in the satellite signal processed by that channel; and a navigation processor for receiving the navigation data from each baseband processor channel and calculation a positional fix.

17. The method according to claim 1, further including the steps of:

obtaining signal samples from a plurality of satellites:

repositioning said signal samples in a samples buffer:

time-tagging said signal samples with a local receiver time;

transforming said signals samples from a time domain to a frequency domain;

transforming said local code replica from the time domain to a frequency domain;

taking a complex conjugate of said local code replica;

multiplying said converted signals with said code replica code to produce a product spectrum;

transforming said product spectrum from the frequency domain back to the time domain and producing a delay-Doppler map of correlation power;

detecting a presence of a signal in the delay-Doppler map;

performing dynamic estimation of time and frequency parameters associated with any found signal;

obtaining data bit synchronization, and;

outputting navigation data bit and signal time and frequency parameters.

18. The method according to claim 17, further including:

resampling the local code replica according to an estimated Doppler frequency;

removing narrowband interference from incoming signals;

circularly shifting incoming signals along a frequency axis;

selecting the frequency of the circular shifting;

filtering said product spectrum;

selecting a range for the transformation to the time domain;

averaging the delay-Doppler map over a predetermined time interval;

interpolating the delay-Doppler map for finer time-frequency resolution;

integrating time-frequency parameter estimates over time to smooth out noise; and estimating a carrier to noise density ratio as an indication of signal strength.

* * * * *

UNITED STATES PATENT AND TRADEMARK OFFICE
CERTIFICATE OF CORRECTION

PATENT NO.    : 6,407,699 B1
DATED         : June 18, 2002
INVENTOR(S)   : Chun Yang It is certified that error appears in the above-identified patent and that said Letters Patent is hereby corrected as shown below:

Column 5,
Line 23, "<" should be -- > --

Signed and Sealed this

Twenty-sixth Day of November, 2002

Attest:

JAMES E. ROGAN
Attesting Officer        Director of the United States Patent and Trademark Office